(12) United States Patent
Konrad et al.

(10) Patent No.: US 7,087,312 B2
(45) Date of Patent: Aug. 8, 2006

(54) POLYESTER FILM HAVING IMPROVED OXYGEN BARRIER AND POLY(M-XYLENEADIPAMIDE)-CONTAINING OVERLAYER, PROCESS FOR ITS PRODUCTION AND ITS USE

(75) Inventors: Matthias Konrad, Hofheim (DE); Herbert Peiffer, Mainz (DE); Gottfried Hilkert, Saulheim (DE)

(73) Assignee: Mitsubishi Polyester Film GmbH, Wlesbaden (DE)

( * ) Notice: Subject to any disclaimer, the term of this patent is extended or adjusted under 35 U.S.C. 154(b) by 0 days.

(21) Appl. No.: 10/757,837

(22) Filed: Jan. 15, 2004

(65) Prior Publication Data

US 2004/0146725 A1 Jul. 29, 2004

(30) Foreign Application Priority Data

Jan. 21, 2003 (DE) ................................ 103 02 033

(51) Int. Cl.
*B32B 27/34* (2006.01)
*B32B 27/36* (2006.01)
(52) U.S. Cl. ................................ 428/474.7; 428/475.2; 428/480
(58) Field of Classification Search ............. 428/474.4, 428/474.7, 475.2, 480
See application file for complete search history.

(56) References Cited

U.S. PATENT DOCUMENTS

| 4,908,272 | A | * | 3/1990 | Harada et al. | 428/412 |
| 5,314,987 | A | * | 5/1994 | Kim et al. | 528/289 |
| 5,695,839 | A | | 12/1997 | Yamada et al. | |
| 6,365,248 | B1 | * | 4/2002 | Hayashi et al. | 428/35.7 |
| 6,444,283 | B1 | * | 9/2002 | Turner et al. | 428/35.7 |
| 6,562,276 | B1 | * | 5/2003 | Shelby et al. | 264/328.8 |

FOREIGN PATENT DOCUMENTS

| EP | 0 540 293 A1 | 5/1993 |
| EP | 0 602 964 A1 | 6/1994 |
| JP | XP002276539 A | 11/1983 |
| JP | XP002276540 A | 1/2001 |
| JP | 2001-347592 | 12/2001 |
| WO | WO 99/62694 A1 | 12/1999 |
| WO | WO 01/92011 A1 | 12/2001 |
| WO | WO 02/38673 A2 | 5/2002 |

* cited by examiner

*Primary Examiner*—Thao T. Tran
(74) *Attorney, Agent, or Firm*—ProPat, L.L.C.

(57) ABSTRACT

Biaxially oriented polyester films which have a polyester-containing base layer (B) and at least one overlayer (A) which comprises poly(m-xyleneadipamide) (MXD6) feature improved optical properties such as increased gloss and very good barrier properties, in particular toward passage of oxygen, and are therefore suitable as packaging materials for foods and other consumable items.

14 Claims, No Drawings

POLYESTER FILM HAVING IMPROVED OXYGEN BARRIER AND POLY(M-XYLENEADIPAMIDE)-CONTAINING OVERLAYER, PROCESS FOR ITS PRODUCTION AND ITS USE

FIELD OF THE INVENTION

The invention relates to a multilayer, transparent, biaxially oriented polyester film having a base layer (B) and, applied to this base layer (B), at least one overlayer (A). In addition to polyester, the overlayer (A) comprises, as an additional polymer, poly(m-xylene-adipamide) (MXD6). The invention further relates to a process for producing the film and to its use.

BACKGROUND OF THE INVENTION

Transparent, biaxially oriented polyester films which feature improved barrier properties are disclosed by the prior art. In most cases, the films obtain their improved barrier layer properties offline after the production by a further processing step. Examples thereof are extrusion coating, coating or lamination with barrier materials, coating under reduced pressure with metals or with ceramic substances, or plasma polymerization in conjunction with vacuum coating.

An exception from this is the process described in detail in WO 99/62694, in which a multilayer, coextruded polyester film which comprises at least one layer of EVOH (ethylene-vinyl alcohol) is simultaneously biaxially stretched. The film features good mechanical properties, but in particular good barrier properties against the passage of oxygen. The best value specified in the document for the achievable oxygen transmission rate (OTR) is 5 cm$^2$/(m$^2$·bar·d). A disadvantage of the process is that regrind obtained in the course of the production cannot be fed back to the process without the film losing its good optical properties.

A further exception is the biaxially oriented film which is described in JP 2001-347592 and consists of a mixture of polyethylene terephthalate and poly(m-xyleneadipamide) (MXD6). The proportion of poly(m-xyleneadipamide) (MXD6) in the film is between 10 and 40% by weight, and the corresponding fraction of polyethylene terephthalate is between 60 and 90% by weight. The film is simultaneously biaxially stretched. It features good mechanical properties, high thermal stability, but in particular a good barrier with regard to the permeation of oxygen. The film achieves an OTR which is less than 30 cm$^3$/(m$^2$·bar·d). In addition, the film features low opacity. The document specifies a value for the opacity which is below 15%. A disadvantage of the film is its two rough surfaces which result from the mixing incompatibility of the two raw materials, polyethylene terephthalate and poly(m-xyleneapdipamide). The high roughness values result in the film losing its original high gloss and obtaining a matt appearance which is undesired for many applications in the packaging industry. A further disadvantage is that the film cannot as efficiently be printed, metalized or coated as films which consist, for example, only of polyethylene terephthalate. The high roughness of the two film surfaces makes the thickness distribution of additionally applied layers (printing inks, metals, varnish, ceramic materials) inadequate. As a result, the physical properties of these layers likewise worsen.

It is an object of the present invention to provide a biaxially oriented polyester film which features very good barrier properties, in particular toward the passage of oxygen. The film should no longer have the disadvantages of the prior art films and should have the following particular features:

- at least one of the two film surfaces has roughness values which are so low that the film has, for example, good printability, good metalizability or good coatability, without the effect of this additional functional layer being impaired;
- at least one of the two film surfaces has such a high gloss that the film can be used for application in packaging without significant restrictions;
- the film can be produced economically, also meaning, for example, that the film can be produced using the stretching processes which are customary in industry, without being restricted to the expensive simultaneous stretching process;
- good adhesion between the individual layers of the film has to be ensured for its practical application;
- the guarantee in the production of the film that the regrind can be fed back to the extrusion in an amount of up to 60% by weight, without the physical and optical properties of the film, but in particular the barrier toward oxygen, being significantly adversely affected.

On the other hand, the other properties which are features of polyester films should at the same time not worsen. These include, for example, the mechanical and the thermal properties, the winding behavior and the processibility of the film, in particular in the printing, laminating or the coating with metallic or ceramic materials.

SUMMARY OF THE INVENTION

This object is achieved by a biaxially oriented polyester film which has a base layer (B) and at least one overlayer (A), wherein the overlayer (A) comprises poly(m-xyleneadipamide) (MXD6).

The base layer (B) also comprises thermoplastic polyester, preferably at least 60% by weight thereof, based on the weight of the layer (B). The overlayer (A) comprises poly(m-xyleneadipamide), preferably from 5 to 100% by weight thereof, based on the weight of the layer (A). In a preferred embodiment, the base layer (B) also comprises poly(m-xyleneadipamide), preferably from 0 to 30% by weight thereof.

Poly(m-xyleneadipamide) (MXD6), also referred to as poly-m-xylyleneadipamide or PA-MXSD6, is a polycondensation product (polyarylamide) of m-xylylenediamine and adipic acid and is offered on the market in various types which are all suitable in principle for the inventive purpose. Preference is given to types having a melt viscosity of less than 2000 poises.

The multilayer, biaxially oriented, transparent polyester film of the present invention, compared to prior art films, has improved optical properties, in particular increased gloss (at least on one film surface). In addition, the film features outstanding barrier properties, in particular toward the passage of oxygen. A minimum adhesion between the individual layers of the film of greater than 0.5 N/25 mm is ensured.

The film has an OTR of preferably less than 5 cm$^3$·m$^{-2}$·d$^{-1}$·bar$^{-1}$, preferably less than 40 cm$^3$·m$^{-2}$·d$^{-1}$·bar$^{-1}$, and more preferably less than 30 cm$^3$ m$^2$·d$^{-1}$·bar$^{-1}$.

The film of the present invention consists of at least the inventive base layer (B) and the inventive overlayer (A). In this case, the film has a two-layer structure. In a preferred embodiment, the film has a three-layer or more than three-layer structure. In that case it consists of the inventive base layer (B), the two inventive overlayers (A) and (C) and any further intermediate layers (D, E, F, . . . ). The overlayers (A) and (C), and also the intermediate layers may be the same or different.

DETAILED DESCRIPTION OF THE INVENTION

The base layer of the film preferably consists of at least 60% by weight of thermoplastic polyester (=component I), based on the total weight of this layer. Suitable for this purpose are, for example, polyesters of ethylene glycol and terephthalic acid (=polyethylene terephthalate, PET), of ethylene glycol and naphthalene-2,6-dicarboxylic acid (=poly-etylene 2,6-naphthalate, PEN), of 1,4-bishydroxymethylcyclohexane and terephthalic acid (=poly-1,4-cyclohexanedimethylene terephthalate, PCDT), and also of ethylene glycol, naphthalene-2,6-dicarboxylic acid and biphenyl-4,4'-dicarboxylic acid (=polyethylene 2,6-naphthalate bibenzoate, PENBB). Preference is given to polyesters which consist of at least 90 mol %, more preferably at least 95 mol %, of ethylene glycol and terephthalic acid units, or of ethylene glycol and naphthalene-2,6-dicarboxylic acid units. The remaining monomer units stem from other diols or other dicarboxylic acids. Advantageously, copolymers or mixtures or blends of the homo- and/or copolymers mentioned may also be used for component I of the base layer (B).

It is particularly advantageous for the last-mentioned case when component I used in the base layer (B) is a polyester copolymer based on isophthalic acid and terephthalic acid or based on terephthalic acid and naphthalene-2,6-dicarboxylic acid. In this case, the producibility of the film is good and the optical properties of the film, and also the barrier properties of the film which are achieved, are particularly good.

In this case, the base layer (B) comprises substantially, as component I, a polyester copolymer which is composed predominantly of isophthalic acid and terephthalic acid units and/or terephthalic acid and naphthalene-2,6-dicarboxylic acid units and of ethylene glycol units, and, as component II, the aforementioned inventive poly(m-xyleneadipamide) (MXD6).

The preferred copolyesters which provide the desired properties of the film (in particular the optical properties, joint stretchability) are those which are composed of terephthalate and isophthalate units and of ethylene glycol units. The proportion of ethylene terephthalate in these copolymers is preferably from 40 to 97 mol % and the corresponding proportion of ethylene isophthalate is from 60 to 3 mol %. Preference is given to copolyesters in which the proportion of ethylene terephthalate is from 50 to 95 mol % and the corresponding proportion of ethylene isophthalate is from 50 to 5 mol %, and greater preference is given to copolyesters in which the proportion of ethylene terephthalate is from 60 to 90 mol % and the corresponding proportion of ethylene isophthalate is from 40 to 10 mol %.

Suitable other aliphatic diols which may be constituents of the polyesters according to the invention are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol), or branched aliphatic glycols having up to 6 carbon atoms, cycloaliphatic, optionally heteroatom-containing diols having one or more rings. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —SO2—. In addition, bisphenols of the formula HO—$C_6H_4$—$C_6H_4$—OH are also very suitable.

Suitable other aromatic dicarboxylic acids which may be constituents of the polyesters according to the invention are preferably benzenedicarboxylic acids, naphthalene-dicarboxylic acids (for example naphthalene-1,4-or -1,6-dicarboxylic acid), biphenyl-x,x'-dicarboxylic acids (in particular biphenyl4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the $(C_3-C_{19})$alkanedioic acids are particularly suitable, and the alkane moiety may be straight-chain or branched.

The polyesters may be prepared by the known transesterification process. This starts from dicarboxylic esters and diols which are reacted with the customary transesterification catalysts, such as zinc salts, calcium salts, lithium salts and manganese salts. The intermediates are then polycondensed in the presence of generally customary polycondensation catalysts such as antimony trioxide or titanium salts. The preparation may equally well be effected by the direct esterification process in the presence of polycondensation catalysts. This starts directly from the dicarboxylic acids and the diols.

Preferably, a further component contained in the base layer (B) is poly(m-xyleneadipamide) (MXD6) (=component II) in an amount of preferably from 0 to 30% by weight, in particular in an amount of from 2 to 25% by weight and more preferably in an amount from 5 to 20% by weight, based on the weight of the base layer (B). The proportion by weight of poly(m-xyleneadipamide) (MXD6) in the base layer (B) is determined primarily by the proportion and composition of the regrind used, which is preferably added to the base layer. Depending on the requirements on the film, further MXD6 may also be added to the base layer. In film production, regrind means offcut material which is fed back to the production process.

For the processing of the polymers, it has been found to be favorable when the poly(m-xyleneadipamide) (MXD6) is selected in such a way that there is not too great a difference in the viscosities of the particular polymer melts. Otherwise, additional elevations/projections, disruptions to flow or streak formation are under some circumstances to be expected on the finished film. Moreover, the polymers then tend to separate. In accordance with the experiments carried out here, the melt viscosity of the poly(m-xyleneadipamide) (MXD6) should preferably be below certain values. Very good results are obtained in the context of the present invention when the melt viscosity for the MXD6 is less than 2000 poises (measured in a capillary rheometer of diameter 0.1 mm, length 10 mm and load 10 kg/cm$^2$, melt temperature 280° C.), preferably less than 1800 poises and more preferably less than 1600 poises.

The poly(m-xyleneadipamide) (MXD6) is appropriately incorporated into the film either as pure granules or as a granulated concentrate (masterbatch). To this end, the polyester granules are premixed with the poly(m-xyleneadipamide) (MXD6) or the poly(m-xyleneadipamide) (MXD6) masterbatch and subsequently fed to the extruder. In the extruder, the components are mixed further and heated to processing temperature. It is appropriate for the process according to the invention when the extrusion temperature is above the melt temperature $T_s$ of the poly(m-xyleneadipamide) (MXD6), generally at least 5° C., preferably from 10 to 50° C., but in particular from 20 to 40° C., above the melt temperature of the poly(m-xyleneadipamide) (MXD6). A preferred extrusion unit for the processing of the mixture or else for the preparation of the masterbatch from components I and II is the twin-screw extruder.

The film of the present invention has an at least two-layer structure. In that case it consists of the inventive base layer (B) and the inventive overlayer (A) disposed on it. In addition, the film may contain additional layers, which are referred to as overlayers or intermediate layers. Typical film structures in that case are ABA or ABC where A and C are appropriate overlayers which may be the same or different.

The (polyester) polymers used for the overlayers may in principle be the same as for the base layer B. In addition, other materials may also be present in the overlayers, in which case the overlayers preferably consist of a mixture of polymers, copolymers or homopolymers, which contains ethylene isophthalate units and/or ethylene 2,6-naphthalate units and/or ethylene terephthalate units. Up to 10 mol % of the polymers may consist of further comonomers.

Advantageously, further components used for the overlayers may also be (polyester) copolymers or (polyester) mixtures or blends of homo- and/or copolymers.

It is particularly appropriate to use a polyester copolymer based on isophthalic acid and terephthalic acid in the overlayers. In this case, the optical properties of the film are particularly good.

In this case, the overlayers or one overlayer of the film comprise(s) substantially a polyester copolymer which is composed predominantly of isophthalic acid and terephthalic acid units and of ethylene glycol units. The remaining monomer units stem from other aliphatic, cycloaliphatic or aromatic diols or other dicarboxylic acids, as may also occur in the base layer. The preferred copolyesters which provide the desired properties of the film (in particular the optical properties) are those which are composed of terephthalate and isophthalate units and of ethylene glycol units. The proportion of ethylene terephthalate is preferably from 40 to 97 mol% and the corresponding proportion of ethylene isophthalate is from 60 to 3 mol %. Preference is given to copolyesters in which the proportion of ethylene terephthalate is from 50 to 90 mol % and the corresponding proportion of ethylene isophthalate is from 50 to 10 mol %, and greater preference is given to copolyesters in which the proportion of ethylene terephthalate is from 60 to 85 mol % and the corresponding proportion of ethylene isophthalate is from 40 to 15 mol%.

According to the invention, one component contained in the overlayer (A) is poly(m-xyleneadipamide) (MXD6) (=component II) in an amount of preferably from 5 to 100% by weight, in particular in an amount of from 7 to 95% by weight and more preferably in an amount from 10 to 90% by weight, based on the weight of the overlayer (A). In a preferred embodiment of the invention, the overlayer (A) contains a higher proportion of poly(m-xyleneadipamide) (MXD6) than the base layer (B).

The thickness of the overlayers is preferably greater than 1.0 μm and is preferably in the range from 1.5 to 20 μm and more preferably in the range from 2.0 to 10 μm.

The base layer (B) and the overlayers (A) and (C) and any intermediate layers present may additionally comprise customary additives, for example stabilizers and antiblocking agents. They are appropriately added to the polymer or to the polymer mixture before the melting. The stabilizers used are, for example, phosphorus compounds, such as phosphoric acid or phosphoric esters. Typical antiblocking agents (also referred to in this context as pigments) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polystyrene or acrylate particles.

The additives selected may also be mixtures of two or more different antiblocking agents or mixtures of antiblocking agents of the same composition but different particle size. The particles may be added to the individual layers in the customary concentrations, for example as a glycolic dispersion during the polycondensation or via masterbatches in the course of the extrusion. Advantageous pigment concentrations have been found to be from 0.0001 to 5% by weight, based on the weight of the layer provided with them. A detailed description of antiblocking agents can be found, for example, in EP-A-0 602 964.

In a preferred embodiment of the invention, the proportion of filler (proportion of pigment) in the overlayer (A) is less than 0.5% by weight, preferably less than 0.4% by weight and more preferably less than 0.3% by weight, based on the weight of the overlayer (A).

In another, particularly preferred embodiment, the film has a three-layer structure and in that case has the base layer (B) and the two overlayers (A) and (C). The further overlayer (C) may have exactly the same composition as the overlayer (A).

In a further, particularly preferred embodiment, the overlayer (C) contains no poly(m-xyleneadipamide) (MXD6), and also not more than 0.5% by weight of a certain filler, for example $SiO_2$, and has an average roughness $R_a$ which is preferably in the range from 10 to 100 nm. It is advantageous when the median diameter $d_{50}$ of the fillers used is in the range from 2.0 to 5.0 μm. This overlayer (C) is then very particularly suitable for the application of further thin functional layers which may be applied inline (in the course of the production of the film) or offline (in the course of the further processing of the film) by suitable processes (for example reverse gravure).

At least one surface of the film according to the invention preferably has an average roughness $R_a$ of from 10 to 100 nm.

The total thickness of the polyester film according to the invention may vary within wide limits and depends on the intended application. It is generally from 6 to 300 μm, preferably from 8 to 200 μm, more preferably from 10 to 100 μm, and the base layer (B) has a fraction of preferably from 40 to 99% of the total thickness.

The present invention also provides a process for producing the film. To produce the base layer (B), the particular components (component I=polyester homo- or polyester copolymer or mixtures thereof, component II=poly(m-xyleneadipamide) (MXD6) granules) are appropriately fed directly to the extruder. The materials can be extruded at from about 270 to 300° C. From a process technology point of view (mixing of the different polymers), it has been found to be particularly favorable when the extrusion of the polymers for the base layer (B) is carried out on a twin-screw extruder having degassing means.

The polymers for the overlayers are appropriately fed to the (coextrusion) system via a further extruder; preference is also to be given here in principle to the twin-screw extruder over the single-screw extruder. The melts are shaped in a multilayer nozzle to give flat melt films and layered one on top of the other. Subsequently, the multilayer film is drawn off and solidified with the aid of a chill roll and optionally further rolls. This prefilm is then biaxially stretched and subsequently heat-set.

In general, the biaxial stretching is carried out sequentially. Preference is given to stretching first in longitudinal direction (i.e. in machine direction) and subsequently in transverse direction (i.e. at right angles to machine direction). The stretching in longitudinal direction can be carried out with the aid of two rolls rotating at different rates in accordance with the desired stretching ratio. For transverse stretching, an appropriate tenter frame is generally used.

The temperature at which the stretching is carried out may vary within a relatively wide range and depends upon the desired properties of the film. In general, the stretching in longitudinal direction is carried out within a temperature range of from 80 (heating temperature from 80 to 130° C.) to 130° C. (stretching temperatures 80–130° C., depending on the stretching ratio) and the transverse stretching within a temperature range of from 90 (beginning of the stretching) to 140° C. (end of the stretching). The longitudinal stretching ratio is preferably in the range from 2.0:1 to 5.0:1, in particular from 2.3:1 to 4.8:1. The transverse stretching ratio is preferably in the range from 2.5:1 to 5.0:1, in particular from 2.7:1 to 4.5:1.

Before the transverse stretching, one or both surfaces of the film may be coated inline by the known processes. The inline coating may lead, for example, to improved adhesion of a metal coating or of a printing ink which might possibly be applied, but also to improvements in the antistatic behavior, in the processing performance, but also to further improvements in the barrier, for example by applying barrier layers which comprise, for example, EVOH, PVOH or the like. Preference is given in that case to applying such layers to the smoother (=less rough) surface of the film. For the production of a film having very particularly good optical properties (=very low opacity) and having good process reliability (few tears), it has been found to be favorable when the planar orientation $\Delta p$ of the film is less than $\Delta p=0.160$, preferably less than $\Delta p=0.158$ and very preferably less than $\Delta p=0.156$. The process parameters in the longitudinal stretching and in the transverse stretching have a significant influence on the planar orientation $\Delta p$ of the finished film. The most important process parameters influencing the planar orientation include the stretching ratios in longitudinal and in transverse direction ($\lambda_{MD}$ and $\lambda_{TD}$) and the stretching temperatures in longitudinal and transverse direction ($T_{MD}$ and $T_{TD}$). When, for example, a machine is used to obtain a planar orientation of the film produced of $\Delta p=0.165$ with the parameter set $\lambda_{MD}=4.6$ and $\lambda_{TD}=4.0$ and $T_{MD}=118°$ C. and $T_{TD}=125°$ C., increasing the longitudinal stretching temperature to $T_{MD}=125°$ C. or increasing the transverse stretching temperature to $T_{TD}=135°$ C. or reducing the longitudinal stretching ratio to $\lambda_{MD}=4.3$ or reducing the transverse stretching ratio to $\lambda_{TD}=3.7$ results in a planar orientation $\Delta p$ being obtained which is within the desired range. The temperatures specified relate, in the case of the longitudinal stretching, to the particular roll temperatures, and, in the case of the transverse stretching, to the film temperatures which have been measured by means of IR.

In the subsequent heat-setting, the film is kept at a temperature of from approx. 150 to 250° C. over a period of from about 0.1 to 10 s. Subsequently, the film is wound up in a customary manner.

The gloss (angle of incidence=20°) of the film surface (B) in the case of a two-layer film or the gloss of the film surface (C) in a three-layer film is preferably greater than 100. In a preferred embodiment, the gloss of these sides is more than 110 and in a particularly preferred embodiment more than 120. These film surfaces are therefore especially suitable for a further functional coating, for printing or for metalization. The high gloss of the film is transferred to the print or to the applied metal layer and thus confers on the film the desired commercially effective appearance.

The opacity of the film is preferably less than 20%. In a preferred embodiment, the opacity of the film is less than 15% and in a particularly preferred embodiment less than 10%. As a result of the low opacity, the film is especially suitable for application in packaging.

A further advantage of the invention is that the production costs of the film according to the invention are not significantly above those of a film of standard polyester raw materials. In addition, it is guaranteed in the course of the production of the film that offcut material, which occurs inherently in the operation of film production, can be reused for the film production as regrind in an amount of up to approx. 60% by weight, preferably from 10 to 50% by weight, based in each case on the total weight of the film, without the physical properties of the film being significantly adversely affected.

The film according to the invention is additionally outstandingly suitable for metalizing or vacuum-coating with ceramic substances. It then has the very particular feature of outstanding barrier properties, especially toward oxygen.

The film according to the invention is therefore especially suitable for packaging foods or other consumable items. The film according to the invention features outstanding barrier properties, in particular toward oxygen.

The table which follows (Table 1) once again summarizes the most important inventive and preferred film properties, and "inventive" is to be regarded as a preferred embodiment.

TABLE 1

| | Inventive | Preferred | More preferred | Unit | Test Method |
|---|---|---|---|---|---|
| Base layer B | | | | | |
| Component I (=thermoplastic polyester) | 60 to 100 | 65 to 98 | 70 to 95 | % by weight | |
| Component II (=poly(m-xylene-adipamide) (MXD6) | 0 to 30 | 2 to 25 | 5 to 20 | % by weight | |
| Melt viscosity of the poly(m-xylene-adipamide) (MXD6) used | <2000 | <1800 | <1600 | Poise | in a capillary rheometer, 280° C. |
| Overlayer (A) | | | | | |
| Component I (=thermoplastic polyester) | 0 to 95 | 5 to 93 | 10 to 90 | % by weight | |

TABLE 1-continued

| | Inventive | Preferred | More preferred | Unit | Test Method |
|---|---|---|---|---|---|
| Component II (=poly(m-xylene-adipamide) (MXD6) | 5 to 100 | 7 to 95 | 10 to 90 | % by weight | |
| Melt viscosity of the poly(m-xylene-adipamide) | <2000 | <1800 | <1600 | Poise | in a capillary rheometer, 280° C. |
| Gloss of surface (B) or (C) Angle of incidence 20° | >100 | >110 | >120 | — | DIN 67530 |
| Thickness of the overlayer (A) Film properties | >1.0 | >1.5 | >2.0 | μm | |
| Permeation coefficient for oxygen | <50 | <40 | <30 | $cm^3$ [12 μm] $(m^2 \cdot bar \cdot d)$ | DIN 53 380, Part 3 |
| OTR of a film of thickness 12 μm | <50 | <40 | <30 | $cm^3/$ $(m^2 \cdot bar \cdot d)$ | DIN 53 380, Part 3 |
| Adhesion between the layers | >0.5 | >1.0 | >1.5 | N/25 mm | as described |
| Planar orientation Δp | <0.160 | <0.158 | <0.156 | | as described |
| Opacity of the film | <20 | <15 | <10 | % | ASTM-D 1003-52 |
| Thickness of the film | 6 to 300 | 8 to 200 | 10 to 100 | μm | |

Test methods

To characterize the raw materials and the films, the following methods were used: DIN=Deutsches Institut für Normung (German Institute for Standardization) ASTM=American Society for Testing and Materials (1) Oxygen transmission rate (OTR)

The oxygen barrier was measured using an OXTRAN® 100 from Mocon Modern Controls (USA) in accordance with DIN 53 380, Part 3 (23° C., 50% relative atmospheric humidity on both sides of the film). The OTR was measured in each case on film of thickness 12 μm.

(2) Opacity

The determination of the opacity of the film was based on ASTM-D 1003-52.

(3) SV value (standard viscosity)

The standard viscosity, SV (DCA), is measured in dichloroacetic acid, based on DIN 53 726. The intrinsic viscosity (IV) is calculated as follows from the standard viscosity:

$$IV (DCA)=6.907 \cdot 10^{-4} SV (DCA)+0.063096$$

(4) Gloss

The gloss was determined to DIN 67530. The reflector value was measured as a characteristic optical parameter for the surface of a film. Based on the standards ASTM-D 523-78 and ISO 2813, the angle of incidence was set to 20°. A light beam hits the flat test surface at the angle of incidence set and is reflected or scattered by it. The light rays incident on the photoelectronic detector are displayed as a proportional electrical quantity. The measurement is dimensionless and has to be quoted together with the angle of incidence.

(5) Roughness

The roughness $R_a$ of the film was determined to DIN 4768 at a cutoff of 0.25 mm. Measurement was effected not on a glass plate but rather in a ring. In the ring method, the film is clamped into a ring, so that neither of the two surfaces touches a third surface (for example glass).

(6) Planar orientation Δp

The planar orientation is determined via the measurement of the refractive indices with an Abbe refractometer (Kruss Optronic, Germany). The planar orientation is always measured on the glossier side of the film. The determination of the refractive indices has already been reproduced in detail, for example, in EP-A-0 952 176, page 10. Therefore reference is made explicitly to this document. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

(7) Adhesion between the layers

Before adhesive bonding, the film specimen (300 mm long·180 mm wide) of the present invention is placed on smooth paperboard (200 mm long·180 mm wide; approx. 400 g/m², bleached, outer layers coated); the projecting film ends are folded back onto the reverse side and secured with adhesive tape.

The film of the present invention is adhesively bonded using a standard polyester film of thickness 12 μm (e.g. MELINEX® 800 film) with a doctor unit and doctor bar no. 3 from Erichsen (Germany), by applying approx. 1.5 ml of adhesive (Novacote®NC 275+CA 12; mixing ratio: 4/1+7 parts of ethyl acetate) to the overlayer A of the film of the present invention. After the solvent has been removed by aeration, the standard polyester film is laminated onto the overlayer A of the film of the present invention using a metal roll (width 200 mm, diameter 90 mm, mass 10 kg, to DIN EN 20 535). The parameters of lamination are:

| | |
|---|---|
| Amount of adhesive: | 5 +/- 1 g/m² |
| Aeration after application of the adhesive: | 4 min +/- 15 s |
| Doctor thickness (Erichsen): | 3 |
| Speed level of the doctor: | approx. 133 mm/s |
| Curing time of the bond: | 2 h at 70° C. in a forced-air oven |

A 25+/−1 mm strip cutter is used to take specimens of length about 100 mm. In this case, approx. 50 mm of adhesive bond and 50 mm of unbonded individual layers are required to secure/clamp the test specimen. The test specimens are secured by means of double-sided adhesive tape by the reverse side of the film of the present invention (base layer B or overlayer C), over the full surface, to a metal support plate. The plate with the adhesively bonded composite is clamped into the lower clamping jaw of the tensile testing machine. The clamp separation is 100 mm. The unlaminated end of the standard polyester film is clamped into the upper clamping jaw of the tensile testing machine (for example INSTRON®, Zwick) in such a way that there is a peeling angle of 180°. The average peeling force in N/25 mm is reported, rounded to one decimal place.

| Sample width: | 25 mm |
|---|---|
| Initial force: | 0.1 N |
| Measurement length: | 25 mm |
| Separation rate up to initial force: | 25 mm/min |
| Initial distance: | 5 mm |
| Test distance: | 40 mm |
| Sensitivity: | 0.01 N |
| Separation rate: | 100 mm/min |

The test result for the peeling force is equivalent to the minimum adhesive force between the layers, since the adhesive force between the adhesive and the standard film is distinctly greater.

EXAMPLES

The examples which follow illustrate the invention. The products used (brands and manufacturer) are each specified only once and then also relate to the examples which follow.

Example 1

Chips of polyethylene terephthalate (prepared by the transesterification process using Mn as the transesterification catalyst, Mn concentration in the polymer: 100 ppm; dried at a temperature of 150° C. to a residual moisture content of below 100 ppm) were fed to the extruder (single-screw extruder) for the base layer (B). Chips of polyethylene terephthalate and poly(m-xyleneadipamide) (MXD6) were likewise fed in a mixing ratio of 50:50 to the extruder (twin-screw extruder) for the overlayer (A). Coextrusion and subsequent stepwise orientation in longitudinal and in transverse direction were then used to produce a transparent, two-layer film having AB structure and a total thickness of 12 μm. The thickness of the overlayer (A) was 2.0 μm.

The production conditions in the individual process steps were:

| Extrusion | Temperatures | A layer: | 290° C. |
|---|---|---|---|
| | | B layer | 290° C. |
| | Temperature of the takeoff roll | | 25° C. |
| Longitudinal stretching: | Stretching temperature: | | 125° C. |
| | Longitudinal stretching ratio: | | 4.0 |
| Transverse stretching: | Stretching temperature: | | 130° C. |
| | Transverse stretching ratio | | 3.9 |
| Setting: | Temperature: | | 230° C. |
| | Time: | | 3 s |

The surface of the base layer (B) had the required high gloss, and the film had the required low opacity and the required low OTR. In addition, the film could be produced very efficiently, i.e. without tears, and also exhibited the desired processing performance.

Example 2

In comparison to Example 1, three-layer film having ABC structure is now produced. To this end, chips of polyethylene terephthalate and a filler were also fed to the extruder (twin-screw extruder) for the overlayer (C). Coextrusion and subsequent stepwise orientation in longitudinal and in transverse direction were used to produce a transparent, three-layer film having ABC structure and a total thickness of 12 μm. The thickness of the overlayer (A) was 2.0 μm, and the thickness of the overlayer (C) was 1.0 μm.

Overlayer (A):

| 50% by weight | of polyethylene terephthalate 4023 from KoSa, Germany having an SV value of 800 |
|---|---|
| 50% by weight | of poly(m-xyleneadipamide) (MXD6) from Mitsubishi Gas Chemical Co. (Japan), product name: NYLON MXD6 6001, having a melt viscosity of 1400 poises |

Base layer (B):

| 100% by weight | of polyester raw material having an SV value of 800, consisting of 99.9% by weight of polyethylene terephthalate 4023 from KoSa (Germany) and 0.1% by weight of silica particles (SYLYSIA ® 320 from Fuji/Japan) having a $d_{50}$ value of 2.5 μm |
|---|---|

Overlayer (A):

| | |
|---|---|
| 50% by weight | of polyethylene terephthalate 4023 from KoSa having an SV value of 800 |
| 50% by weight | of poly(m-xyleneadipamide) (MXD6) from Mitsubishi Gas Chemical Co., product name: NYLON MXD6 6001, having a melt viscosity of 1400 poises. |

Base layer (B):

| | |
|---|---|
| 100% by weight | of polyethylene terephthalate 4023 from KoSa having an SV value of 800 |

Overlayer (C):

| | |
|---|---|
| 100% by weight | of polyester raw material having an SV value of 800, consisting of 99% by weight of polyethylene terephthalate 4023 from KoSa and 1.0% by weight of silica particles (SYLYSIA ® 320 from Fuji/Japan) having a $d_{50}$ value of 2.5 μm |

The production conditions in the individual process steps were similar to those in Example 1. The surface of the overlayer (C) had the required high gloss, the required low opacity and the required low OTR. In addition, the film could be produced very efficiently, i.e. without tears, and also exhibited the desired processing performance.

Example 3

A film was produced in accordance with Example 2. In this case, the base layer (B) also contained poly(m-xyleneadipamide) (MXD6). The corresponding proportion of poly(m-xyleneadipamide) (MXD6) in the base layer was 10% by weight. This allowed the OTR of the film and the adhesion between the layers (A) and (B) to be further improved.

Comparative Example CE1

A film was produced in accordance with Example 1 of JP 2001-347592. The roughness values of this film are too high, and the gloss of the film is not within the inventive range.

The properties and the structure of the films produced according to the examples and the comparative examples are compiled in Table 2.

The invention claimed is:

1. A polyester film comprising a base layer (B) and at least one overlayer (A), wherein the base layer (B) and the overlayer (A) comprise a mixture of thermoplastic polyester and poly(m-xyleneadipamide), said base layer (B) comprising from 5 to 20% poly(m-xyleneadipamide) based on the weight of the base layer (B), said overlayer (A) comprising from 10 to 90% poly(m-xyleneadipamide) based on the weight of the base layer (A), said film further comprising a layer (C) disnosed on lever (B) on the surface opposite layer (A), wherein said layer (C) alone comprises at least one anti-blocking agent and the film exhibiting an oxygen transmission of less than 30 cm³/(m²·bar·d) based on 12 μm thick film and an interlaminar adhesion of greater than 1.5 N/25 mm.

2. The polyester film as claimed in claim 1, wherein the overlayer (A) comprises from 10 to 90% by weight of poly(m-xyleneadipamide) and from 10 to 90% thermoplastic polyester, each based on the weight of the overlayer (A).

3. The polyester film as claimed in claim 1, wherein the melt viscosity of the poly(m-xyleneadipamide) is smaller than 2000 poises.

4. The polyester film as claimed in claim 1, wherein the thermoplastic polyester of the base layer (B) has one or more of ethylene glycol units and terephthalie acid units, or ethylene glycal units and naphthalene- 2,6-dicarboxylic acid units.

TABLE 2

| Examples | Film thickness μm | Film structure | Thickness of the overlayer A μm | Poly(m-xyleneadipamide) (MXD6) proportion in overlayer A % by weight | Poly(m-xyleneadipamide) (MXD6) proportion in base layer B % by weight | Gloss of surface (A, B or C) Angle of incidence 20* | Roughness $R_a$ of surface (A, B or C) μm | Planar orientation Δp | OTR cm³/ m²·bar·d | Adhesion between the layers A and B N/25 mm | Opacity of the film % |
|---|---|---|---|---|---|---|---|---|---|---|---|
| Example 1 | 12 | AB | 2 | 15 | 0 | Gloss of surface B = 130 | Roughness of surface B = 70 | 0.154 | 40 | 1 | 8 |
| Example 2 | 12 | ABC | 2 | 15 | 0 | Gloss of surface C = 170 | Roughness of surface C = 50 | 0.154 | 40 | 1 | 5 |
| Example 3 | 12 | ABC | 2 | 50 | 10 | Gloss of surface C = 170 | Roughness of surface C = 50 | 0.154 | 20 | 1.8 | 6 |
| CE1 | 12 | B | | | 20 | 65 | 170 | | 22 | | 8 |

5. The polyester film as claimed in claim 1, wherein the polyester of the base layer (B) has isophthalic acid units, terephthalic acid units, and ethylene glycol units.

6. The polyester film as claimed in claim 1, wherein polyethylene terephihalate is used aspolyinster of the base layer (B).

7. The polyester film as claimed in claim 1, which has an A-B-C layer structure, A and C being overlayers having the same or different polyester.

8. The polyester film as claimed in claim 7, wherein the overlayers comprise the same polyester used for the base layer (B).

9. The polyester film as claimed in claim 1, wherein at least one suifaco of the film has a gloss greater than 100.

10. The polyester film as claimed in claim 1, which has an opacity smaller than 20 db.

11. A polyester film according to claim 1, wherein the planar orientation of said film is less than 0.160.

12. A polyester film according to claim 1, wherein said overlayer (A) is disposed directly on said base layer (B).

13. A polyester film according to claim 1, wherein at least one surface of the film has an average roughness Ra of from 10 to 100 nm and a gloss (angle of incidence =20°) of greater than 100.

14. A packaging film comprising a polyester film as claimed in claim 1.

* * * * *

UNITED STATES PATENT AND TRADEMARK OFFICE
CERTIFICATE OF CORRECTION

PATENT NO. : 7,087,312 B2  Page 1 of 1
APPLICATION NO. : 10/757837
DATED : August 8, 2006
INVENTOR(S) : Konrad et al.

It is certified that error appears in the above-identified patent and that said Letters Patent is hereby corrected as shown below:

Claims

Column 14
Claim 1, Line 21, delete "disnosed" insert --disposed--
Claim 4, Line 39, delete "glycal" insert --glycol--
Claim 6, Line 66, delete "aspolyinster" insert --as polyester--

Column 15
Claim 10, Line 12, delete "db" insert --%--

Column 16
Claim 13, Line 7, delete "o "

Signed and Sealed this

Tenth Day of October, 2006

JON W. DUDAS
*Director of the United States Patent and Trademark Office*